(12) United States Patent
Curry

(10) Patent No.: US 6,431,734 B1
(45) Date of Patent: Aug. 13, 2002

(54) MOTOR VEHICLE SEAT HAVING EXTENDABLE LIGHT

(75) Inventor: Harold M. Curry, Waterford, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/741,932

(22) Filed: Dec. 20, 2000

(51) Int. Cl.[7] .............................................. B60Q 1/00
(52) U.S. Cl. ...................... 362/488; 362/511; 362/131
(58) Field of Search ................................ 362/511, 488, 362/131, 581, 391, 487

(56) References Cited

U.S. PATENT DOCUMENTS

| | | |
|---|---|---|
| 1,845,401 A | 2/1932 | Dietrich |
| 1,930,993 A | 10/1933 | Blodgett |
| 2,031,643 A | 2/1936 | Granovsky |
| 2,251,544 A | 8/1941 | Jiranek |
| 2,833,502 A | 5/1958 | Wildeboor |
| 2,979,576 A * | 4/1961 | Huber ........................ 191/12.4 |
| 3,099,398 A | 7/1963 | Croteau |
| 3,320,413 A | 5/1967 | Mansson |
| 3,339,030 A | 8/1967 | Nilsson |
| 4,217,628 A | 8/1980 | Windom |
| 4,823,239 A | 4/1989 | Doty |
| 4,894,755 A | 1/1990 | Chandler |
| 5,278,736 A * | 1/1994 | Falcoff et al. .............. 362/141 |
| 5,490,046 A | 2/1996 | Gohl et al. |
| 5,709,448 A | 1/1998 | Jennings et al. |
| 5,892,436 A | 4/1999 | Blackburn et al. |
| 6,082,881 A | 7/2000 | Hicks |
| 6,264,339 B1 * | 7/2001 | von Glasow ................ 359/872 |

\* cited by examiner

*Primary Examiner*—Sandra O'Shea
*Assistant Examiner*—Ali Alavi
(74) *Attorney, Agent, or Firm*—Brooks & Kushman P.C.

(57) ABSTRACT

A motor vehicle seat assembly comprises a seat, a tether, and a light unit. The seat has an opening, and the tether is movable between a stowed position and an extended position wherein the tether extends from the opening. The light unit is mounted on the distal end of the tether, and includes a finger hole, a lens, and a power switch.

6 Claims, 1 Drawing Sheet

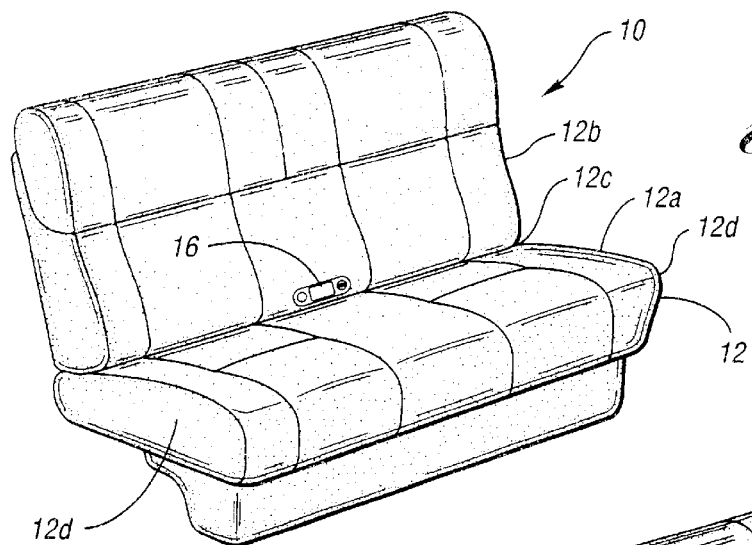
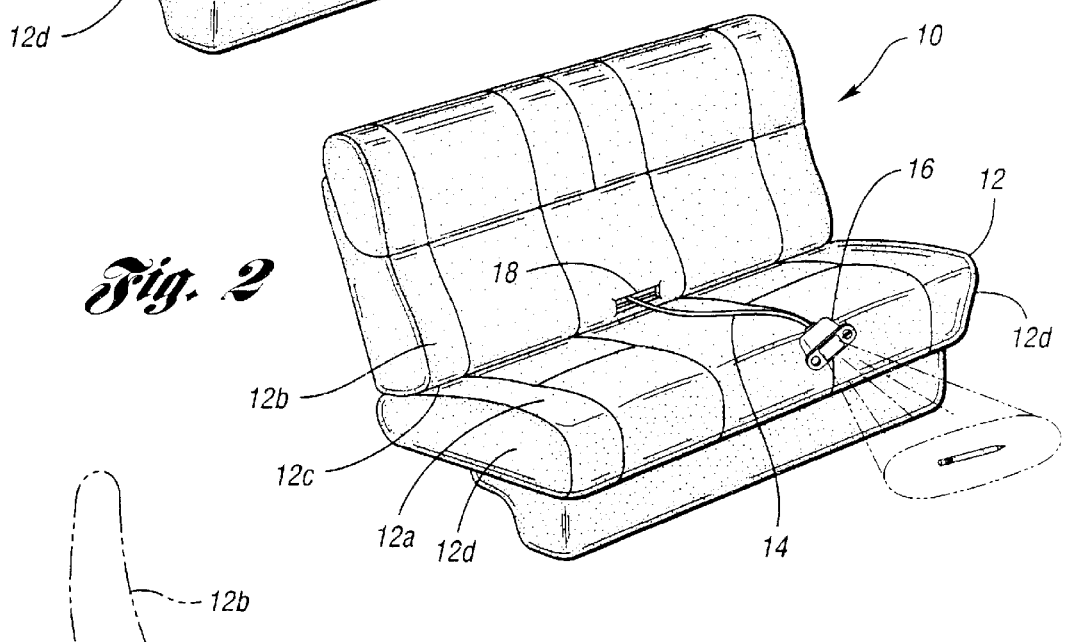
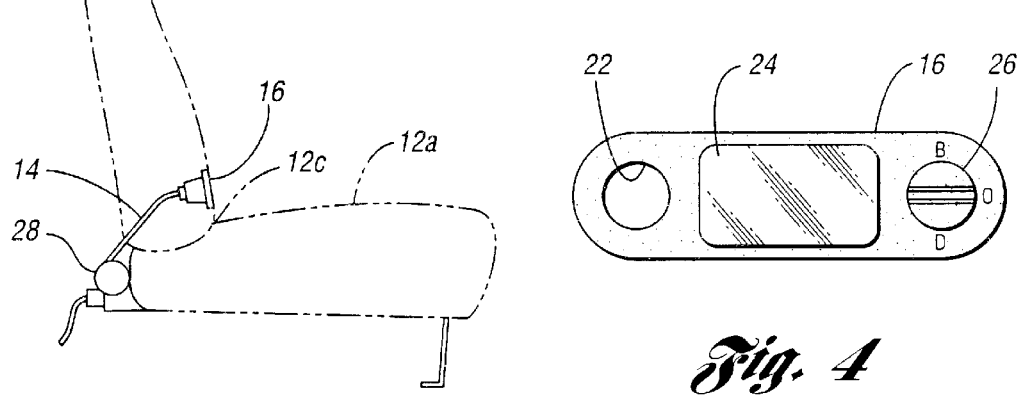
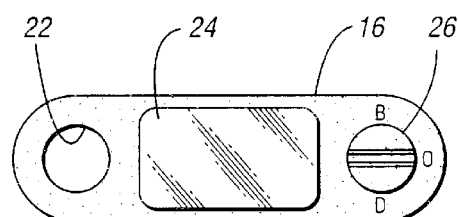

MOTOR VEHICLE SEAT HAVING EXTENDABLE LIGHT

TECHNICAL FIELD

This invention relates to motor vehicle seats.

BACKGROUND OF THE INVENTION

Various forms of interior lighting exist for motor vehicles. Generally, these systems operate to provide illumination during dim or dark conditions. U.S. Pat. No. 6,082,881, for example, shows a vanity light for a vehicular rearview mirror.

Moreover, the illumination source of such systems is typically fixed. For instance, U.S. Pat. No. 1,845,401 shows a folding lamp for automobile rear seats. In cases where a movable light source is provided, the light source is not intended to be shown upon an area, such as might be required when searching an occupant's surrounding area. U.S. Pat. No. 5,892,436, for example, shows an illuminated seat belt buckle.

SUMMARY OF THE INVENTION

This invention is an improved motor vehicle seat assembly comprising a motor vehicle seat, an arm, and a light unit. The motor vehicle seat has an opening, and the arm is movable between a stowed position and an extended position wherein the arm extends from the opening. The light unit is mounted on the distal end of the arm, and includes a finger hole, a lens, and a power switch.

Accordingly, it is an object of the present invention to provide an improved motor vehicle seat assembly of the type described above for allowing a vehicle passenger to easily locate objects in dark or dim conditions.

These and other objects, features, and advantages of the present invention are readily apparent from the following detailed description of the best modes for carrying out the invention when taken in conjunction with the accompanying drawings.

BRIEF DESCRIPTION OF THE DRAWINGS

FIG. 1 is a perspective view of a motor vehicle seat assembly according to the present invention showing an arm in a stowed position;

FIG. 2 is a perspective view of a the seat assembly showing the arm in an extended position;

FIG. 3 is a schematic cross-sectional view of the seat assembly; and

FIG. 4 is a front view of a light unit for use with the seat assembly of the present invention.

DETAILED DESCRIPTION OF THE PREFERRED EMBODIMENT

With reference to the drawings, the preferred embodiments of the present invention will be described. FIGS. 1 through 3 show a motor vehicle seat assembly 10 comprising a motor vehicle seat 12, a tether 14, and a light unit 16. The seat 12 has a generally vertically extending seat bottom 12a and a generally vertically extending seat back 12b having a junction 12c with the seat bottom.

The seat 12 has an opening 18 adjacent the junction 12c of the seat back 12b with the seat bottom 12a. In a preferred embodiment of the invention, the opening 18 is located centrally intermediate the ends 12d of a rear bench seat. It should be understood, however, that the present invention is equally adapted for use with other types of vehicle seats. The tether 14 is flexible, and contains either a fiber optic cable or the electrical wiring necessary to power a conventional light bulb. The tether 14 is movable between a stowed position shown in FIG. 1 and an extended position shown in FIG. 2.

The light unit 16 is mounted on the distal end of the tether 14. As best shown in FIG. 4, the light unit 16 includes a finger hole 22, a lens 24, and a power switch 26. The finger hole 22 is optional, and may be provided for ease of use. The lens 24 is preferably translucent plastic, and is advantageously situated between the finger hole 22 and the power switch 26. The lens 24 functions to direct light from a source of illumination situated behind the lens. This source may be either a conventional bulb or a fiber optic cable carrying light from a remote light source.

The power switch 26 has at least two settings for setting a corresponding light level emitted from the lens 24. Most preferably, the power switch 26 is a three-position rotary switch having off, dim and bright level settings as shown.

A retractor 28 is connected to the tether 14. The retractor 28 is adapted to retract the tether 14 into the opening, and may be similar to any known retractor such as those that are readily available for use with seat belts. U.S. Pat. No. 4,823,239, for instance, teaches a seat belt retractor with known means to selectively apply tension to reels for retracting the belts, and to lock the reels against rotation. This system also includes lighting means for illuminating areas of the vehicle floor adjacent the retractor assembly.

As FIG. 1 shows, the light unit 16 is substantially flush with the opening 18 when the tether 14 is in the stowed position. In its extended position shown in FIG. 2, the tether 14 extends from the opening 18. With the tether 14 partially or fully extended, the light unit 16 is more easily brought to bear on a desired location to illuminate that area. For example, the light unit 16 may be directed onto the floor of the vehicle adjacent the rear passenger seat to assist in the location of items during dim or dark conditions.

While the embodiments of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. A motor vehicle seat assembly comprising:
   a seat including a generally horizontally extending seat bottom and a generally vertically extending seat back having a junction with the seat bottom, and the seat having an opening adjacent the junction of the seat back with the seat bottom;
   a flexible tether that extends through the opening of the seat and has a distal end;
   a light unit secured to the distal end of the flexible tether and including a lens and a power switch; and
   a retractor connected to the flexible tether to provide retraction thereof into the opening in order to stow the light unit flush with respect to the opening of the seat, and the retractor also permitting extension of the flexible tether to permit use of the light unit by operation of the power switch.

2. A motor vehicle seat assembly as in claim 1 wherein the light unit includes a finger hole.

3. A motor vehicle seat assembly as in claim 1 wherein the power switch of the light unit has at least two settings for setting the a corresponding light level emitted from the lens.

4. A motor vehicle seat assembly as in claim 1 wherein the power switch of the light unit has at least off, bright, and dim settings for setting the a corresponding light level emitted from the lens.

5. A motor vehicle seat assembly comprising:
- a seat including a generally horizontally extending seat bottom and a generally vertically extending seat back having a junction with the seat bottom, and the seat having an opening adjacent the junction of the seat back with the seat bottom;
- a flexible tether that extends through the opening of the seat and has a distal end;
- a light unit secured to the distal end of the flexible tether and including a finger hole, a lens, and a power switch having off, bright and dim settings for setting a corresponding light level emitted from the lens; and
- a retractor connected to the flexible tether to provide retraction thereof into the opening in order to stow the light unit flush with respect to the opening of the seat, and the retractor also permitting extension of the flexible tether to permit use of the light unit by operation of the power switch.

6. A motor vehicle seat assembly comprising:
- a bench seat having ends and including a generally horizontally extending seat bottom and a generally vertically extending seat back having a junction with the seat bottom, and the seat having an opening located centrally between its ends adjacent the junction of the seat back with the seat bottom;
- a flexible tether that extends through the opening of the seat and has a distal end;
- a light unit secured to the distal end of the flexible tether and including a finger hole, a lens, and a power switch having off, bright and dim settings for setting a corresponding light level emitted from the lens; and
- a retractor connected to the flexible tether to provide retraction thereof into the opening in order to stow the light unit flush with respect to the opening of the seat, and the retractor also permitting extension of the flexible tether to permit use of the light unit by operation of the power switch.

* * * * *